US010976891B2

(12) United States Patent
Gomez et al.

(10) Patent No.: US 10,976,891 B2
(45) **Date of Patent: *Apr. 13, 2021**

(54) REMOTE DEVICE MANAGEMENT INTERFACE

(71) Applicant: Hand Held Products, Inc., Fort Mill, SC (US)

(72) Inventors: Garrison Gomez, Marietta, NY (US); Daniel Yeakley, Monroe, NC (US); Michael Doren, Cicero, NY (US); Daniel French, Charlotte, NC (US); David Mangicaro, Syracuse, NY (US); Thomas Koziol, Camillus, NY (US); Adam Haile, Lake Wylie, SC (US); Aldo Caballero, Durham, NC (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/348,326

(22) Filed: Nov. 10, 2016

(65) Prior Publication Data

US 2017/0060383 A1 Mar. 2, 2017

Related U.S. Application Data

(63) Continuation of application No. 12/961,627, filed on Dec. 7, 2010, now Pat. No. 9,497,092.

(Continued)

(51) Int. Cl.

*G06F 3/0481* (2013.01)
*H04W 64/00* (2009.01)

(Continued)

(52) U.S. Cl.

CPC ........ *G06F 3/04817* (2013.01); *G06F 3/0482* (2013.01); *G06F 3/0486* (2013.01);

(Continued)

(58) Field of Classification Search

CPC ..... H04L 41/22; H04L 41/0893; H04L 67/36; H04W 4/00-003; H04W 4/02-028;

(Continued)

(56) References Cited

U.S. PATENT DOCUMENTS 1,726,343 A 8/1929 Danziger
5,109,486 A 4/1992 Seymour (Continued)

OTHER PUBLICATIONS

Fifth Chinese Office Action in counterpart Chinese Application No. 2016110301554670 dated Nov. 8, 2016, pp. 1-8 [All references previously cited].

(Continued)

*Primary Examiner* — Matthew Ell
*Assistant Examiner* — Linda Huynh
(74) *Attorney, Agent, or Firm* — Alston & Bird LLP

(57) ABSTRACT

A network for remotely managing a plurality of remote devices that are each individually configurable to have selected operating characteristics includes a server connected to the network and to the plurality of remote devices, and a display coupled to a computer which is connected to the network. Also included are means for assigning a common icon to each remote device of the same type and displaying the icons on the server display, and means for coloring each icon to indicate a current configuration status of each remote device and for displaying the color on the icon on the display.

22 Claims, 11 Drawing Sheets

Related U.S. Application Data

(60) Provisional application No. 61/267,641, filed on Dec. 8, 2009.

(51) Int. Cl.
*G06F 3/0484* (2013.01)
*G06F 3/0486* (2013.01)
*H04L 12/24* (2006.01)
*G06F 3/0482* (2013.01)

(52) U.S. Cl.
CPC ........ *G06F 3/04842* (2013.01); *H04L 41/082* (2013.01); *H04L 41/0893* (2013.01); *H04L 41/147* (2013.01); *H04L 41/22* (2013.01); *H04W 64/00* (2013.01); *H04L 41/0631* (2013.01)

(58) Field of Classification Search
CPC ....... H04W 4/06–10; H04W 24/00–10; H04W 64/00–006; G06F 11/327; G06F 3/0481; G06F 3/04817; G06F 3/04845
See application file for complete search history.

(56) References Cited

U.S. PATENT DOCUMENTS 5,261,044 A 11/1993 Dev et al.
5,402,316 A 3/1995 Volz et al.
5,463,742 A 10/1995 Kobayashi
5,504,921 A 4/1996 Dev et al.
5,546,145 A 8/1996 Bernardi et al.
5,552,959 A 9/1996 Penniman et al.
5,579,001 A 11/1996 Dempsey et al.
5,579,529 A 11/1996 Terrell et al.
5,579,775 A 12/1996 Dempsey et al.
5,587,560 A 12/1996 Crooks et al.
5,615,625 A 4/1997 Cassidy et al.
5,640,953 A 6/1997 Bishop et al.
5,655,081 A 8/1997 Bonnell et al.
5,687,734 A 11/1997 Dempsey et al.
5,724,509 A 3/1998 Starkweather et al.
5,742,286 A * 4/1998 Kung .................... G06F 3/0486 715/733
5,752,917 A 5/1998 Fuchs
5,774,793 A 6/1998 Cooper et al.
5,793,967 A 8/1998 Simciak et al.
5,798,951 A 8/1998 Cho et al.
5,805,442 A 9/1998 Crater et al.
5,815,735 A 9/1998 Baker
5,819,110 A 10/1998 Motoyama
5,825,617 A 10/1998 Kochis et al.
5,835,733 A 11/1998 Walsh et al.
5,848,253 A 12/1998 Walsh et al.
5,862,349 A 1/1999 Cho et al.
5,867,714 A 2/1999 Todd et al.
5,875,312 A 2/1999 Walsh et al.
5,878,256 A 3/1999 Bealkowski et al.
5,889,964 A 3/1999 Cho et al.
5,904,727 A 5/1999 Prabhakaran
5,921,459 A 7/1999 Heraly et al.
5,931,909 A 8/1999 Taylor
5,935,244 A 8/1999 Swamy et al.
5,941,965 A 8/1999 Moroz et al.
5,961,337 A 10/1999 Kordes
5,978,591 A 11/1999 Batholomew et al.
6,032,202 A 2/2000 Lea et al.
6,037,788 A 3/2000 Krajec et al.
6,049,454 A 4/2000 Howell et al.
6,070,012 A 5/2000 Eitner et al.
6,085,244 A 7/2000 Wookey
6,088,752 A 7/2000 Ahem
6,091,602 A 7/2000 Helot
6,098,097 A 8/2000 Dean et al.
6,108,717 A 8/2000 Kimura et al.
6,109,039 A 8/2000 Hougham et al.
6,142,593 A 11/2000 Kim et al.
6,151,643 A 11/2000 Cheng et al.
6,158,430 A 12/2000 Pfeiffer et al.
6,160,719 A 12/2000 May et al.
6,161,133 A 12/2000 Kikinis
6,171,559 B1 1/2001 Sanders et al.
6,188,572 B1 2/2001 Liao et al.
6,195,265 B1 2/2001 Choi et al.
6,199,108 B1 3/2001 Casey et al.
6,202,209 B1 3/2001 Bartholomew et al.
6,226,739 B1 5/2001 Eagle
6,240,297 B1 5/2001 Jadoul et al.
6,247,074 B1 6/2001 Shin et al.
6,256,691 B1 7/2001 Moroz et al.
6,267,475 B1 7/2001 Lee et al.
6,279,059 B1 8/2001 Ludtke et al.
6,279,154 B1 8/2001 Davis
6,285,911 B1 9/2001 Watts, Jr. et al.
6,297,963 B1 10/2001 Fogle
6,301,106 B1 10/2001 Helot et al.
6,311,321 B1 10/2001 Agnihotri et al.
6,324,692 B1 11/2001 Fiske
6,330,597 B2 12/2001 Collin et al.
6,339,745 B1 * 1/2002 Novik .................... G07C 5/008 342/357.31
6,341,274 B1 1/2002 Leon
6,341,320 B1 1/2002 Watts, Jr. et al.
6,360,362 B1 3/2002 Fichtner et al.
6,378,128 B1 4/2002 Edelstein et al.
6,407,335 B1 6/2002 Franklin-Lees et al.
6,407,915 B1 6/2002 Derocher et al.
6,425,126 B1 7/2002 Branson et al.
6,442,639 B1 8/2002 McElhattan et al.
6,452,325 B1 9/2002 Dupont
6,456,306 B1 9/2002 Chin et al.
6,457,076 B1 9/2002 Cheng et al.
6,461,181 B1 10/2002 Goh et al.
6,467,088 B1 10/2002 Alsafadi et al.
6,477,588 B1 11/2002 Yerazunis et al.
6,484,315 B1 11/2002 Ziese
6,489,932 B1 12/2002 Chitturi et al.
6,505,121 B1 1/2003 Russell
6,506,009 B1 1/2003 Nulman et al.
6,511,031 B2 1/2003 Lin
6,519,143 B1 2/2003 Goko et al.
6,539,358 B1 3/2003 Coon et al.
6,542,943 B2 4/2003 Cheng et al.
6,558,049 B1 5/2003 Shin
6,560,643 B1 5/2003 Shepherd et al.
6,584,336 B1 6/2003 Ali et al.
6,584,499 B1 6/2003 Jantz et al.
6,587,874 B1 7/2003 Golla et al.
6,593,528 B2 7/2003 Franklin-Lees et al.
6,594,534 B1 7/2003 Crowell
6,606,678 B1 8/2003 Nakamura et al.
6,614,979 B2 9/2003 Bourdeau et al.
6,615,405 B1 9/2003 Goldman et al.
6,628,517 B1 9/2003 Helot et al.
6,633,482 B2 10/2003 Rode
6,658,659 B2 12/2003 Hiller et al.
6,668,296 B1 12/2003 Dougherty et al.
6,683,786 B2 1/2004 Yin et al.
6,684,241 B1 1/2004 Sandick et al.
6,697,032 B2 2/2004 Chitturi et al.
6,722,192 B2 4/2004 Benedict et al.
6,725,260 B1 4/2004 Philyaw
6,725,281 B1 4/2004 Zintel et al.
6,728,956 B2 4/2004 Ono et al.
6,742,025 B2 5/2004 Jennery et al.
6,751,681 B2 6/2004 Torli et al.
6,754,723 B2 6/2004 Kato et al.
6,760,761 B1 7/2004 Sciacca
6,763,403 B2 7/2004 Cheng et al.
6,766,175 B2 7/2004 Uchiyama
6,766,956 B1 7/2004 Boylan, III et al.
6,770,028 B1 8/2004 Ali et al.
6,772,264 B1 8/2004 Dayan et al.
6,778,824 B2 8/2004 Wonak et al.
6,779,068 B2 8/2004 Kim et al.

(56) References Cited

U.S. PATENT DOCUMENTS 6,784,855 B2 8/2004 Matthews et al.
6,806,813 B1 10/2004 Cheng et al.
6,832,082 B1 12/2004 Ramaswamy et al.
6,832,373 B2 12/2004 O'Neill
6,833,787 B1 12/2004 Levi
6,833,989 B2 12/2004 Helot et al.
6,850,158 B1 2/2005 Williams
6,854,112 B2 2/2005 Crespo et al.
6,857,013 B2 2/2005 Ramberg et al.
6,863,210 B2 3/2005 Becker et al.
6,864,891 B2 3/2005 Myers
6,868,468 B2 3/2005 Boz et al.
6,886,104 B1 4/2005 McClurg et al.
6,889,263 B2 5/2005 Motoyama
6,895,261 B1 5/2005 Palamides
6,895,445 B2 5/2005 Ying et al.
6,898,080 B2 5/2005 Yin et al.
6,904,457 B2 6/2005 Goodman
6,907,603 B2 6/2005 Scott
6,915,514 B1 7/2005 Machida
6,920,631 B2 7/2005 Delo
6,928,493 B2 8/2005 Motoyama
6,944,854 B2 9/2005 Kehne et al.
6,944,858 B2 9/2005 Luu
6,947,612 B2 9/2005 Helms et al.
6,954,142 B2 10/2005 Lieberman et al.
6,955,517 B2 10/2005 Nulman et al.
6,959,172 B2 10/2005 Becker et al.
6,961,586 B2 11/2005 Barbosa et al.
6,966,058 B2 11/2005 Earl et al.
6,968,550 B2 11/2005 Branson et al.
6,970,952 B2 11/2005 Motoyama
6,973,799 B2 12/2005 Kuehl et al.
6,976,062 B1 12/2005 Denby et al.
6,981,086 B2 12/2005 Wetzel et al.
6,985,945 B2 1/2006 Farhat et al.
6,987,988 B2 1/2006 Uchiyama
6,990,549 B2 1/2006 Main et al.
6,990,660 B2 1/2006 Moshir et al.
6,993,615 B2 1/2006 Falcon
6,993,760 B2 1/2006 Peev et al.
6,996,634 B1 2/2006 Herrod et al.
6,999,898 B2 2/2006 King et al.
7,000,228 B2 2/2006 Mortazavi
7,003,560 B1 2/2006 Mullen et al.
7,013,331 B2 3/2006 Das
7,020,571 B2 3/2006 Lee et al.
7,024,189 B2 4/2006 Wonak et al.
7,039,688 B2 5/2006 Matsuda et al.
7,043,537 B1 5/2006 Pratt
7,054,423 B2 5/2006 Nebiker et al.
7,054,977 B2 5/2006 Kadambi et al.
7,069,006 B2 6/2006 Wonak
7,072,675 B1 7/2006 Kanakubo
7,076,536 B2 7/2006 Chiloyan et al.
7,080,371 B1 7/2006 Arnaiz et al.
7,085,805 B1 8/2006 Ruberg et al.
7,085,824 B2 8/2006 Forth et al.
7,086,049 B2 8/2006 Goodman
7,089,551 B2 8/2006 Fordemwalt et al.
7,099,152 B2 8/2006 Gasbarro et al.
7,100,271 B2 9/2006 Bauiler et al.
7,107,380 B1 9/2006 Mohan
7,111,055 B2 9/2006 Falkner
7,114,021 B2 9/2006 Seshadri
7,117,239 B1 10/2006 Hansen
7,117,286 B2 10/2006 Falcon
7,130,896 B2 10/2006 Engel et al.
7,133,939 B1 11/2006 Desal et al.
7,149,792 B1 12/2006 Hansen et al.
7,159,016 B2 1/2007 Baker
7,185,014 B1 2/2007 Hansen
7,185,075 B1 * 2/2007 Mishra .................... H04L 41/00 379/207.01
7,188,160 B2 3/2007 Champagne et al.
7,188,171 B2 3/2007 Srinivasan et al.
7,191,435 B2 3/2007 Lau et al.
7,194,526 B2 3/2007 Kanemitsu et al.
7,216,343 B2 5/2007 Das et al.
7,272,711 B2 9/2007 Suda et al.
7,289,995 B2 10/2007 Motoyama et al.
7,290,258 B2 10/2007 Steeb et al.
7,316,013 B2 1/2008 Kawano et al.
7,363,359 B1 4/2008 Tripathy et al.
7,367,514 B2 5/2008 Soule, III et al.
7,375,654 B2 5/2008 Culpepper et al.
7,487,114 B2 2/2009 Florance et al.
7,539,862 B2 5/2009 Edgett et al.
7,564,376 B2 * 7/2009 Jang ................. G08G 1/096716 340/905
7,857,222 B2 12/2010 Kosecki et al.
7,979,854 B1 7/2011 Borole et al.
8,635,309 B2 1/2014 Berthiaume et al.
8,907,603 B2 12/2014 Shibata
9,497,092 B2 11/2016 Gomez et al.
2001/0042112 A1 11/2001 Slivka et al.
2002/0073304 A1 6/2002 Marsh et al.
2002/0083160 A1 6/2002 Middleton
2002/0086703 A1 7/2002 Dimenstein et al.
2002/0087392 A1 7/2002 Stevens
2002/0087668 A1 7/2002 San Martin et al.
2002/0087960 A1 7/2002 Hisatake
2002/0092008 A1 7/2002 Kehne et al.
2002/0092013 A1 7/2002 Delo
2002/0094208 A1 7/2002 Palumbo
2002/0095484 A1 7/2002 Pagani et al.
2002/0100036 A1 7/2002 Moshir et al.
2002/0103900 A1 * 8/2002 Cornelius ............. G06F 11/079 709/224
2002/0109665 A1 8/2002 Matthews et al.
2002/0129350 A1 9/2002 Wang et al.
2002/0129355 A1 9/2002 Velten et al.
2002/0139855 A1 * 10/2002 Dvorkis ............. G06K 7/10653 235/462.01
2002/0147974 A1 10/2002 Wookey
2002/0174223 A1 * 11/2002 Childers ............. H04L 41/0856 709/224
2002/0179715 A1 * 12/2002 Kawai ................ G06K 7/10851 235/462.13
2002/0184349 A1 12/2002 Manukyan
2002/0184350 A1 12/2002 Chen
2002/0187024 A1 12/2002 Nulman
2002/0191940 A1 12/2002 Bourdeau
2002/0198969 A1 12/2002 Engel et al.
2003/0018694 A1 1/2003 Chen et al.
2003/0031539 A1 2/2003 Nulman et al.
2003/0046675 A1 3/2003 Cheng et al.
2003/0051235 A1 3/2003 Simpson
2003/0059022 A1 3/2003 Nebiker et al.
2003/0084436 A1 5/2003 Berger et al.
2003/0088651 A1 5/2003 Wilson
2003/0097427 A1 5/2003 Parry
2003/0101021 A1 5/2003 Shah et al.
2003/0111245 A1 6/2003 Haggerty
2003/0154471 A1 8/2003 Teachman et al.
2003/0188306 A1 10/2003 Harris et al.
2003/0198015 A1 10/2003 Vogt
2003/0217357 A1 11/2003 Parry
2003/0217358 A1 11/2003 Thurston et al.
2003/0221190 A1 11/2003 Deshpande et al.
2003/0225939 A1 12/2003 Ying et al.
2003/0231211 A1 12/2003 Shah et al.
2004/0002943 A1 1/2004 Merrill et al.
2004/0015949 A1 1/2004 Taylor
2004/0020974 A1 2/2004 Becker et al.
2004/0024933 A1 2/2004 Billington et al.
2004/0049233 A1 3/2004 Edwards
2004/0050247 A1 3/2004 Topping
2004/0083471 A1 4/2004 Nam et al.
2004/0098571 A1 5/2004 Falcon
2004/0103172 A1 5/2004 Chen et al.
2004/0123281 A1 6/2004 Olrik et al.
2004/0127210 A1 7/2004 Shostak
2004/0139757 A1 7/2004 Kuehl et al.

(56) References Cited

U.S. PATENT DOCUMENTS

2004/0143032 A1 7/2004 Auschra et al.
2004/0148600 A1 7/2004 Hoshino
2004/0154014 A1 8/2004 Bunger
2004/0168167 A1 8/2004 Ono
2004/0177380 A1 9/2004 Hamel et al.
2004/0181593 A1 9/2004 Kanojia et al.
2004/0192329 A1 9/2004 Barbosa et al.
2004/0199615 A1 10/2004 Philyaw
2004/0205709 A1 10/2004 Hiltgen et al.
2004/0206821 A1* 10/2004 Longacre, Jr. ..... G06K 17/0022 235/462.07
2004/0210897 A1 10/2004 Brockway et al.
2004/0212822 A1 10/2004 Schinner
2004/0216099 A1 10/2004 Okita et al.
2004/0235532 A1 11/2004 Matthews et al.
2004/0243991 A1 12/2004 Gustafson et al.
2004/0243995 A1 12/2004 Sheehy
2004/0255023 A1 12/2004 Motoyama et al.
2004/0268340 A1 12/2004 Steeb et al.
2005/0044544 A1 2/2005 Slivka et al.
2005/0050538 A1 3/2005 Kawamata et al.
2005/0052156 A1 3/2005 Liebenow
2005/0060862 A1 3/2005 Baulier
2005/0065822 A1 3/2005 Ying et al.
2005/0086328 A1 4/2005 Landram et al.
2005/0093821 A1 5/2005 Massie et al.
2005/0097543 A1 5/2005 Hirayama
2005/0097544 A1 5/2005 Kim
2005/0108700 A1 5/2005 Chen et al.
2005/0132348 A1 6/2005 Meulemans et al.
2005/0132349 A1 6/2005 Roberts et al.
2005/0132350 A1 6/2005 Markley et al.
2005/0132351 A1 6/2005 Randall et al.
2005/0144612 A1 6/2005 Wang et al.
2005/0144614 A1 6/2005 Moslander et al.
2005/0156715 A1* 7/2005 Zou ..................... B60R 25/1025 340/426.19
2005/0159847 A1 7/2005 Shah et al.
2005/0168700 A1 8/2005 Berg et al.
2005/0204036 A1 9/2005 Farhat et al.
2005/0204353 A1 9/2005 Ji
2005/0210458 A1 9/2005 Moriyama et al.
2005/0210459 A1 9/2005 Henderson et al.
2005/0210466 A1 9/2005 Carter et al.
2005/0223372 A1 10/2005 Borchers
2005/0223373 A1 10/2005 Gage et al.
2005/0229171 A1 10/2005 Henry et al.
2005/0235076 A1 10/2005 Winarski et al.
2005/0246703 A1 11/2005 Ahonen
2005/0251799 A1 11/2005 Wang
2005/0254776 A1 11/2005 Morrison et al.
2005/0257205 A1 11/2005 Costea et al.
2005/0257209 A1 11/2005 Adams et al.
2005/0273229 A1 12/2005 Steinmeier et al.
2005/0278001 A1 12/2005 Qin et al.
2006/0010437 A1 1/2006 Marolia
2006/0013646 A1 1/2006 Baulier et al.
2006/0019679 A1* 1/2006 Rappaport ............ G01S 5/0252 455/456.5
2006/0029489 A1 2/2006 Nulman et al.
2006/0031617 A1 2/2006 Falcon
2006/0031828 A1 2/2006 Won et al.
2006/0041881 A1 2/2006 Adkasthala
2006/0049677 A1 3/2006 Lawrence et al.
2006/0069813 A1 3/2006 Biamonte et al.
2006/0070055 A1 3/2006 Hodder et al.
2006/0082965 A1 4/2006 Walker et al.
2006/0091216 A1* 5/2006 Page ........................ G06K 7/14 235/462.07
2006/0099971 A1* 5/2006 Staton .................... G08C 17/00 455/456.6
2006/0106965 A1 5/2006 Falcon
2006/0130037 A1 6/2006 Mackay
2006/0132964 A1 6/2006 Lau et al.
2006/0136893 A1 6/2006 Blossom et al.
2006/0142129 A1 6/2006 Siaperas
2006/0149321 A1 7/2006 Merry et al.
2006/0149322 A1 7/2006 Merry et al.
2006/0149323 A1 7/2006 Merry et al.
2006/0150177 A1 7/2006 Liu et al.
2006/0156302 A1 7/2006 Yamamoto et al.
2006/0168578 A1 7/2006 Vorlicek
2006/0168581 A1 7/2006 Goger et al.
2006/0172873 A1 8/2006 Beard
2006/0179431 A1 8/2006 Devanathan et al.
2006/0200812 A1 9/2006 Mizutani et al.
2006/0206888 A1 9/2006 Mavrinac et al.
2006/0218545 A1 9/2006 Taguchi
2006/0220840 A1* 10/2006 Culpepper ............ B60R 25/102 340/539.13
2006/0236518 A1 10/2006 Baulier
2006/0238364 A1* 10/2006 Keefe ................ G05B 23/0267 340/646
2006/0238384 A1 10/2006 Hess et al.
2006/0248522 A1 11/2006 Lakshminarayanan et al.
2006/0248524 A1 11/2006 Seely
2006/0265446 A1 11/2006 Elgressy et al.
2006/0277299 A1* 12/2006 Baekelmans ....... G06F 11/0709 709/224
2007/0006207 A1 1/2007 Appaji
2007/0006213 A1 1/2007 Shahidzadeh et al.
2007/0006214 A1 1/2007 Dubal et al.
2007/0033279 A1* 2/2007 Battat ..................... H04L 41/22 709/224
2007/0038990 A1 2/2007 White et al.
2007/0055969 A1 3/2007 Yang
2007/0055970 A1 3/2007 Sakuda et al.
2007/0074201 A1 3/2007 Lee
2007/0083630 A1 4/2007 Roth et al.
2007/0093243 A1 4/2007 Kapadekar et al.
2007/0169073 A1 7/2007 O'Neill et al.
2007/0169089 A1 7/2007 Bantz et al.
2007/0169090 A1 7/2007 Kang
2007/0169092 A1 7/2007 Lee
2007/0169093 A1 7/2007 Logan et al.
2007/0171093 A1* 7/2007 Jang ................. G08G 1/096716 340/936
2007/0174834 A1 7/2007 Purkeypile et al.
2007/0220505 A1 9/2007 Bukovec et al.
2007/0234331 A1 10/2007 Schow et al.
2007/0245333 A1 10/2007 Ferlitsch
2008/0070495 A1 3/2008 Stricklen et al.
2008/0141166 A1* 6/2008 Goldberg ............ G06F 3/04817 715/788
2008/0185432 A1 8/2008 Caballero et al.
2008/0209411 A1 8/2008 Koziol et al.
2009/0013258 A1* 1/2009 Hintermeister ....... G06F 11/328 715/736
2009/0019152 A1* 1/2009 Huang .................. H04L 67/125 709/224
2009/0030556 A1 1/2009 Castelli et al.
2009/0044003 A1* 2/2009 Berthiaume ............ G06F 16/17 713/100
2009/0138826 A1* 5/2009 Barros .............. G06F 17/30241 715/841
2009/0210814 A1* 8/2009 Agrusa ................. G06T 11/206 715/772
2009/0300179 A1* 12/2009 Srinivasan ....... H04N 21/26291 709/225
2010/0087188 A1* 4/2010 Griff ....................... H04L 43/00 455/424
2010/0131455 A1 5/2010 Logan et al.
2012/0221954 A1 8/2012 Tanaka

OTHER PUBLICATIONS

English-translation of Fifth Chinese Office Action in counterpart Chinese Application No. 2016110301554670 dated Nov. 8, 2016, pp. 1-11.

(56) References Cited

OTHER PUBLICATIONS

Fourth Chinese Office Action in related application CN201010601656. 0. dated May 3, 2016, English Machine Translation provided, 26 pages [Previoulsy submitted in parent application].
First Chinese Office Action in Patent Application 201010601656.0 dated Sep. 5, 2014; Original and English translation provided. 22 pages [Previously submitted in parent applicaton].
Second Chinese Office Action in related Application No. 201010601656. 0, dated May 14, 2015, 17 pages, English translation provided. [Previously submitted in parent application].
Third Chinese Office Action in related Application No. 201010601656. 0, dated Dec. 31, 2015, 18 pages, English translation provided. [Previously submitted in parent application].
Decision on Rejection in counterpart Chinese Application No. 201010601656.0 dated Sep. 6, 2017, pp. 1-7 [All references previously cited].
English-translation of Decision on Rejection in counterpart Chinese Application No. 201010601656.0 dated Sep. 6, 2017, pp. 1-10.
Author unlisted, "iPass Policy Orchestration Automates Continuous Endpoint Security", Redwood Shores, California, Nov. 15, 2004, iPass Inc., press release found at http://www.ipass.com/pressroom/pressroom_printfriendly.html?rid=132, pp. 1 through 3, printed Feb. 26, 2007. [Previously submitted in parent application].
Author unlisted, "iPass makes Mobile Device Management Easier and More Cost-Effective With New, Web-Based Version of Endpoint Policy Management ", Redwood Shores, California, May 15, 2006, iPass Inc., press release found at http://www.ipass.com/pressroom/pressroom_printfriendly.html?rid=204, pp. 1 through 2, printed Feb. 26, 2007. [Previously submitted in parent application].
Author unlisted, "iPass Solves End-User Compliance Issues With New Solution for Trusted Mobility", Redwood Shores, California, Jun. 27, 2005, iPass Inc., press release found at http://www.ipass.com/pressroom/pressroom_printfriendly.html?rid=163, pp. 1 through 3, printed Feb. 26, 2007. [Previously submitted in parent application].
Hand Held Products Partners with SOTI on Remote Device Management and Security, article found at http://www.handheld.com/Site.aspx/na/en/news_events/news_listing/listing/article/?article . . . , pp. 11 through 2, printed Mar. 31, 2009. [Previously submitted in parent application].
Author unlisted, Honeywell, NaurTech, CETerm, "Industrial Browser & Terminal Emulation", pp. 1 through 2. [Previously submitted in parent application].
Author unlisted, Honeywell, SOTi.net, MobiControl v5, Honeywell Imaging and Mobility, 700 Visions Dr., Skaneateles Falls, NY 13153-0208, found at www.honeywell.com/aidc, pp. 1 and 2. [Previously submitted in parent application].
Sixth Chinese Office Action in counterpart Chinese Application No. 201010601656.0 dated Mar. 2, 2017, pp. 1-7 [All references previously cited].
English-translation of Sixth Chinese Office Action in counterpart Chinese Application No. 201010601656.0 dated Mar. 2, 2017, pp. 1-10.
Notice of Reexamination in counterpart Chinese Application No. 201010601656.0 dated Jul. 5, 2018, pp. 1-7 [All references previously cited].
English-translation of Notice of Reexamination in counterpart Chinese Application No. 201010601656.0 dated Jul. 5, 2018, pp. 1-9.
Reexamination Decision in counterpart Chinese Application No. 201010601656.0 dated Oct. 12, 2018, pp. 1-13 [All references previously cited].
English-translation Rexamination Decision in counterpart Chinese Application No. 201010601656.0 dated Oct. 12, 2018, pp. 1-7.
Fourth Chinese Office Action in related application CN201010601656. 0. dated May 3, 2016, English Machine Translation provided, 26 pages [References have been previously cited and considered].
Advisory Action dated Jan. 6, 2016 for U.S. Appl. No. 12/961,627.
Advisory Action dated Jul. 8, 2013 for U.S. Appl. No. 12/961,627.
Advisory Action dated Mar. 25, 2015 for U.S. Appl. No. 12/961,627.
Applicant Initiated Interview Summary Mailed on Jan. 6, 2016 for U.S. Appl. No. 12/961,627.
Applicant Initiated Interview Summary Mailed on Jul. 5, 2013 for U.S. Appl. No. 12/961,627.
Applicant Initiated Interview Summary Mailed on May 23, 2013 for U.S. Appl. No. 12/961,627.
Applicant Initiated Interview Summary Mailed on Sep. 24, 2015 for U.S. Appl. No. 12/961,627.
Examiner initiated interview summary dated Aug. 15, 2013 for U.S. Appl. No. 12/961,627.
Examiner initiated interview summary dated Jun. 29, 2016 for U.S. Appl. No. 12/961,627.
Final Rejection dated Apr. 12, 2013 for U.S. Appl. No. 12/961,627.
Final Rejection dated Jan. 15, 2015 for U.S. Appl. No. 12/961,627.
Final Rejection dated Oct. 9, 2015 for U.S. Appl. No. 12/961,627.
Non-Final Rejection dated Aug. 14, 2014 for U.S. Appl. No. 12/961,627.
Non-Final Rejection dated Jun. 17, 2015 for U.S. Appl. No. 12/961,627.
Non-Final Rejection dated Oct. 26, 2012 for U.S. Appl. No. 12/961,627.
Notice of Allowance and Fees Due dated Jun. 29, 2016 for U.S. Appl. No. 12/961,627.

* cited by examiner

REMOTE DEVICE MANAGEMENT INTERFACE

CROSS-REFERENCE TO RELATED APPLICATIONS

The present application claims the benefit of U.S. patent application Ser. No. 12/961,627 for Remote Device Management Interface filed Dec. 7, 2010 (and published Jun. 9, 2011 as U.S. Patent Publication No. 2011/0138310), now U.S. Pat. No. 9,497,092, which claims the benefit of U.S. Patent Application No. 61/267,641 for Remote Device Management Interface filed Dec. 8, 2009. Each of the foregoing patent applications, patent publication, and patent is hereby incorporated by reference in its entirety.

FIELD OF THE INVENTION

This invention relates to the management of remote devices such as portable data terminals (PDTs), and more particularly to an interface for managing the remote devices.

BACKGROUND

Remote devices, such as portable data terminals (PDTs), portable data assistants (PDAs), and other devices used for automatic identification and data collection (AIDC) generally provide data at remote locations back to a central office. Sometimes these devices have the ability to monitor the operation of the device and to provide device status information to the central office. Such a remote device is described in U.S. Patent Publication No. 2008/0185432 A1 to Caballo et al. which is hereby incorporated by reference.

The remote devices can have the ability to have their configuration changed or to have a new application program installed while away from the central office. U.S. Patent Publication No. 2009/0044003 A1 to Berthiaume et al. teaches such a method, and is hereby incorporated by reference.

The remote devices can be managed by Remote Device Management (RDM) systems that allow an RDM user to manage the remote devices including updating configurations and device software, and to track problems which may be common to several devices, and provide fixes for these problems where feasible.

However, some RDM systems accumulate vast amounts of diagnostic and performance data. Organizing the data in a clear, concise, meaningful, and intuitive way on the graphical user interface of a computer display is a problem. Either too much data is presented so as to be cluttered and confusing, or the user has to navigate through multiple, sometimes non-intuitive, dialogs to access desired information.

Figure 1:
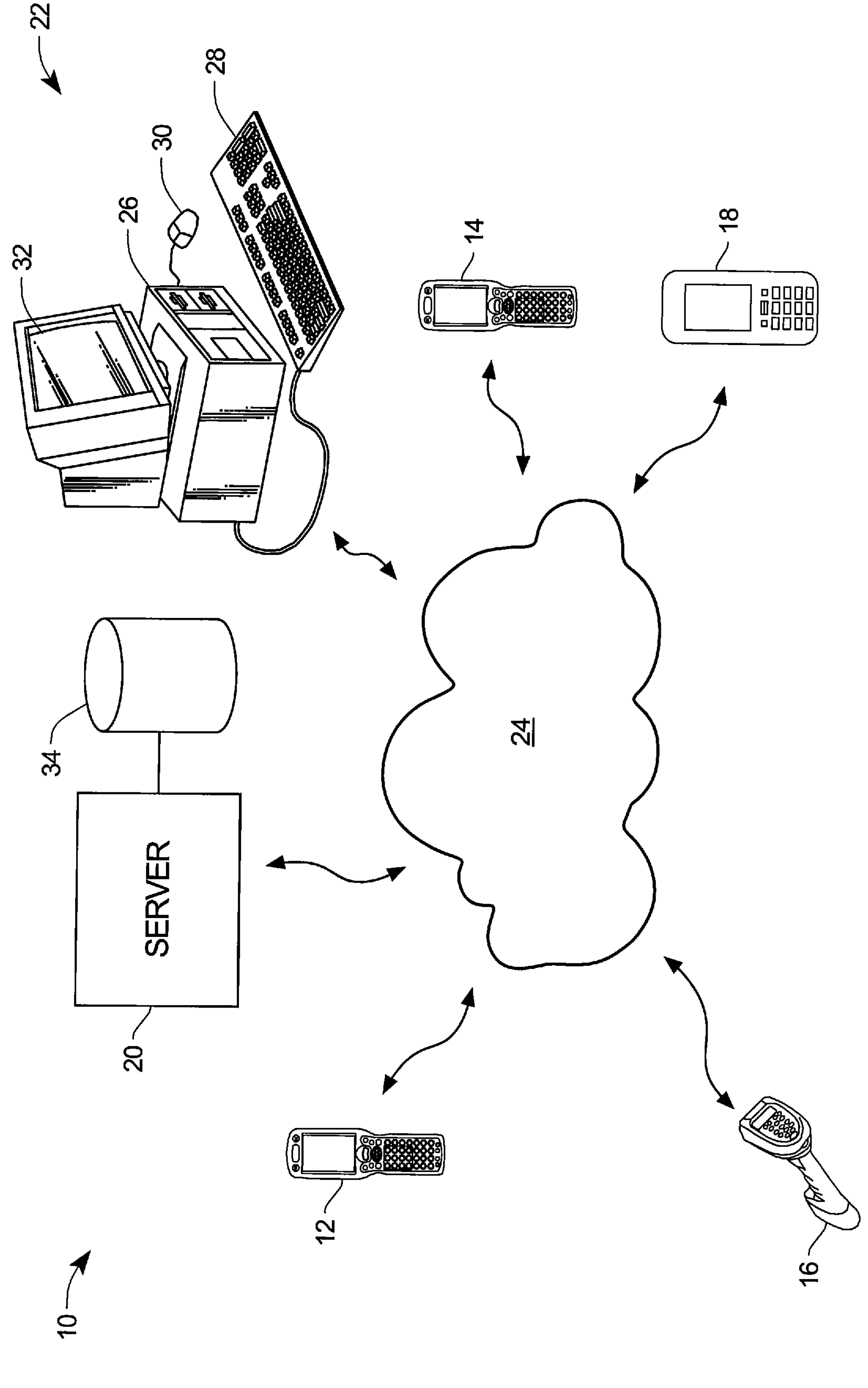
FIG. 1 is a diagram of a system of remote devices in communication with a server and a remote device management terminal in accordance with at least one embodiment of the present invention.

It will be appreciated that for purposes of clarity and where deemed appropriate, reference numerals have been repeated in the figures to indicate corresponding features.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

Referring to FIG. 1, a diagram 10 of a system of remote devices 12, 14, 16, and 18 in communication with a server 20 and a remote device management terminal 22 through a Wide Area Network (WAN) 24 in accordance with at least one embodiment of the present invention is shown. Those skilled in the art will understand that the WAN 24 may comprise the internet, cellular phone communication, other RF communication systems, etc. and combinations thereof. The remote device management terminal 22 includes a data processing unit 26, a keyboard 28, a pointing device 30 with at least two buttons for left and right clicks, and a display 32. The server 20 may have connected thereto a data storage module 34.

The remote devices 12-16 are data collection devices (DCDs) which may be portable data terminals (PDTs), portable data assistants (PDAs), etc. Data collection devices are a class of devices used to collect, process, and transfer data to a data processing system.

In operation, the remote devices 12-16 have the ability to monitor the operation of the respective devices and to provide device status and performance information to the central office as described in U.S. Patent Publication No. 2008/0185432 A1. The server 20 receives the data from remote devices, such as the remote devices 12-16 and provides configuration update information to the remote devices. The terminal 22 interacts with the server 20 to provide interface screens on the display 32 allowing a user of the remote devices to locate each remote device, determine the configuration of each remote device, analyze the performance of the remote devices, and send updated configuration information to the remote devices as necessary. The server 20 may also have error detection and configuration software, stored in a hard drive in the data processing unit 26 or the data storage module 34, which operates independently of the interface screens on the display 32.

Figure 2A:
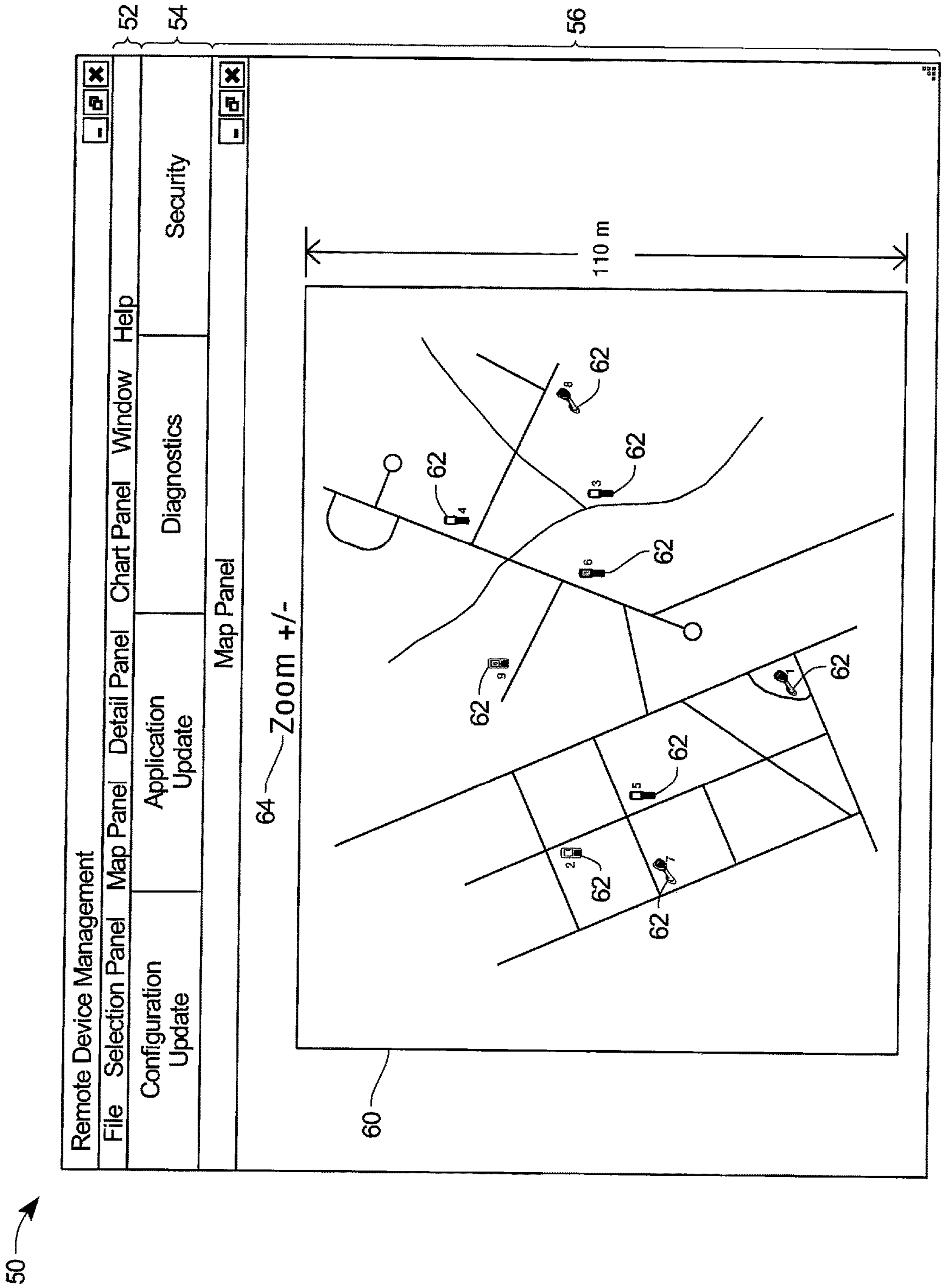
FIGS. 2A-2I are user interface screens showing displayed information, screen configuration options, and control commands for monitoring and controlling the configuration of the remote devices shown in FIG. 1.

FIG. 2A is one embodiment of a user interface screen 50, in the form of a Graphical User Interface (GUI), which might be shown on the display 32. The screen has a title "Remote Device Management" and has three main sections: a menu section 52, which has drop down lists (File, Selection Panel, Map Panel, Detail Panel, Window, and Help) for configuring the screen 50, a remote device interaction menu section 54 which has drop down lists (Configuration Update, Application Update, Diagnostics, and Security) for updating or querying one or more remote devices such as the remote devices 12-16, and a graphical presentation section 56 for providing graphical information that a user can view and manipulate.

FIG. 2A shows a map 60 of a geographical region with remote devices indicated by icons 62 (each associated with a number 1-9 in the map 60) representing the types of remote devices, some of which are colored (numbers 1, 6, 8, and 9)

to indicate configuration information about the devices. A user can select the type of icon which represent different configuration information, the color, and other variables which may make up each icon using the "Map Panel" button in the menu section 52. Complete configuration information for each of the remote devices may be stored in the data storage module 34. The location of each remote device may be determined from the longitude and latitude detected by each remote device using an internal GPS module and sent to the server 20. A user can zoom in on sections of the map using a zoom control 64, and the area covered in the map is indicated by a scale on the right side of the map 60.

Figure 2B:
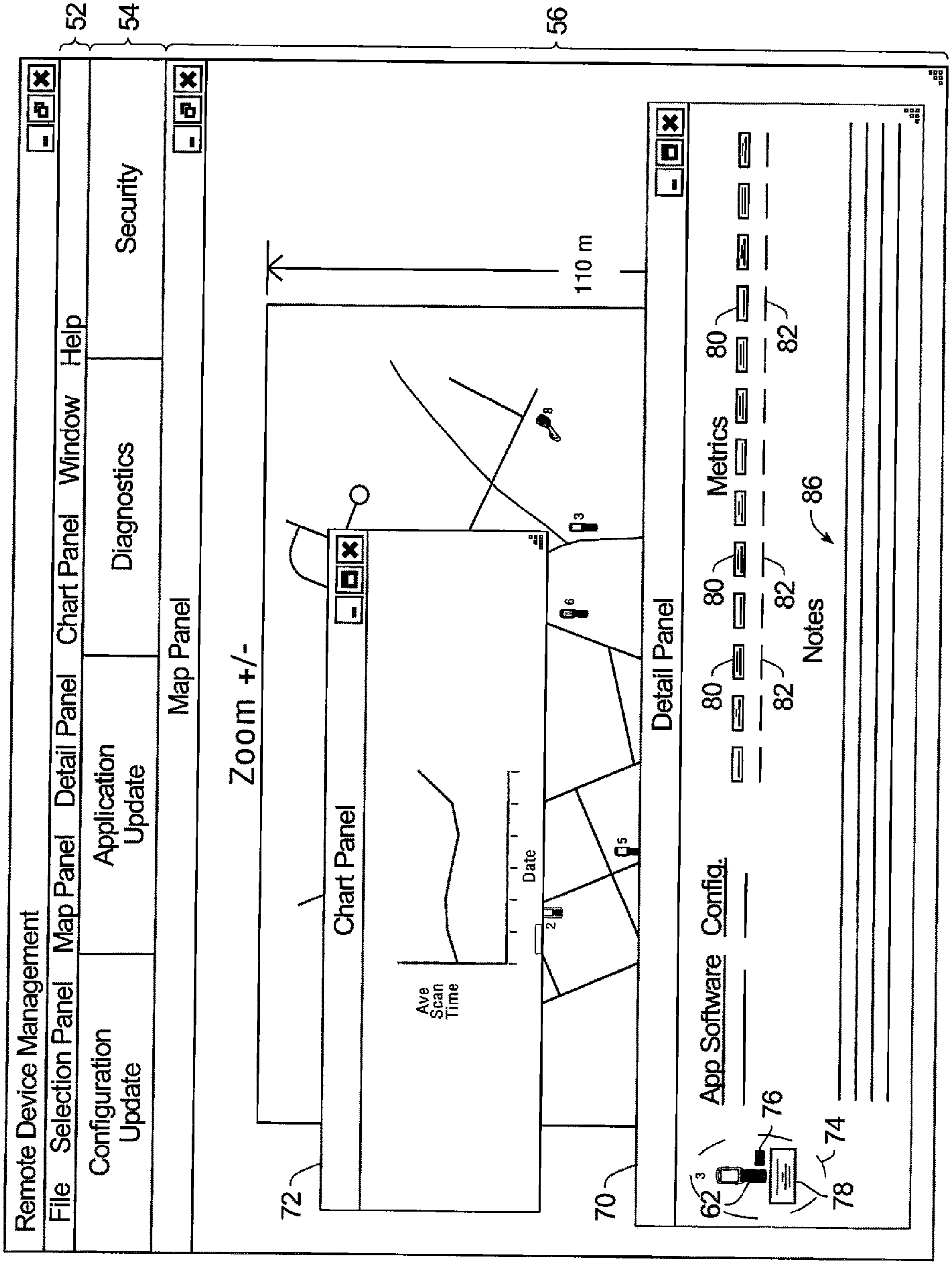

In one embodiment of the present invention a double left click on the pointing device 30 with the pointing device arrow over an icon, for example the icon of remote device numbered 3, causes a detail panel window 70 and a chart panel window 72 to pop up as shown in FIG. 2B. The detail window 70 may have an icon grouping 74 representing the particular remote device 62 with the same number as that shown in the map. Each grouping 74 may also include the icon 62 representing the type of device and icon 76 representing the type of symbology that the particular remote device is configured to recognize along with more configuration information in a configuration box 78 below the icon 62. For example a camera icon 76 may indicate a remote device with a picture taking capability. The application software (App Software) which is used in the remote device may be shown along with the software configuration (Config.). In addition, a list of the monitored data, labeled "Metrics" in FIG. 2B, that has been sent to the server 30 may be shown. Each metric may be described in a box 80 with the current value on a line 82 for the metric shown below each box 80. There may also be a section 86 for the user to enter notes on the selected device.

The chart panel 72 is shown with a graph of the average scan time versus time which the selected remote device has reported which is data of one of the metrics 80 shown in the detail panel. The data contained in both the detail panel 70 and the chart panel 72 can be customized using the Detail Panel button and the Chart Panel button, respectively, in the menu section 52. Each of the panels, which include the map panel, the detail panel, the chart panel, and the selection panel in the embodiment shown in the drawings, can be moved, sized, enabled, disabled, and hidden by the user.

Figure 2C:
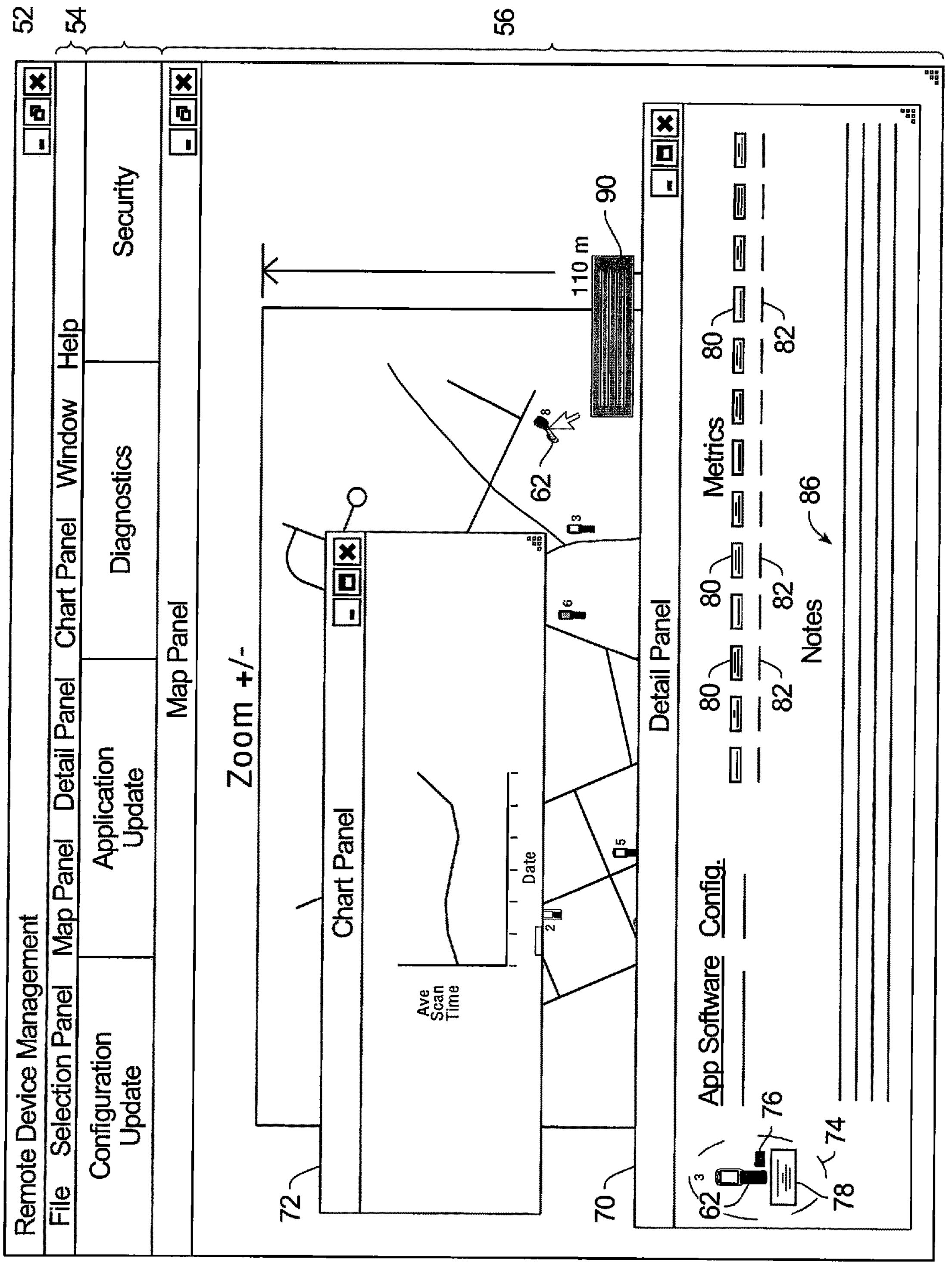

FIG. 2C is FIG. 2B in which the arrow controlled by the pointing device 30 is hovering over the icon 62 for remote device number 8. A box 90 containing configuration information is produced to allow a user to quickly determine more detailed configuration information about the remote device.

Figure 2D:
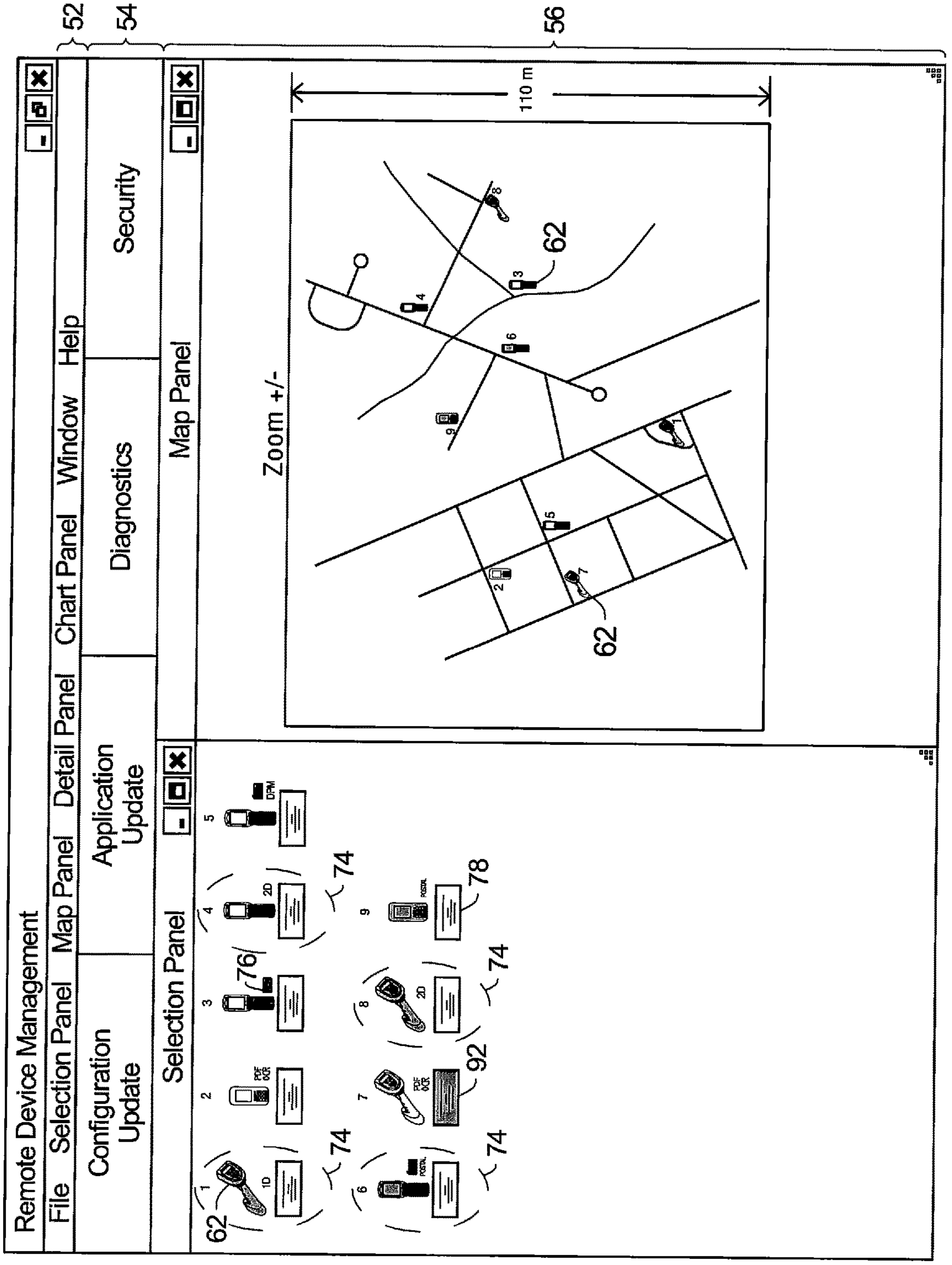

FIG. 2D is another configuration of the user interface screen which has a selection panel on the left side and the map panel on the right side. The selection panel may have icon groupings 74 for each of the remote devices shown in the map panel. Each icon grouping 74 may have the combination of icons 62 and 76 and configuration information box 78 shown in the left side of the detail panel shown in FIG. 2B. The hover and double click capabilities of the pointing device with regard to the map panel also apply to the selection panel. A configuration box 92 may have colored text indicating a particular type of configuration. The colored text in the configuration box 92 allows the user to quickly identify remote devices 62 that have a particular configuration.

Figure 2E:
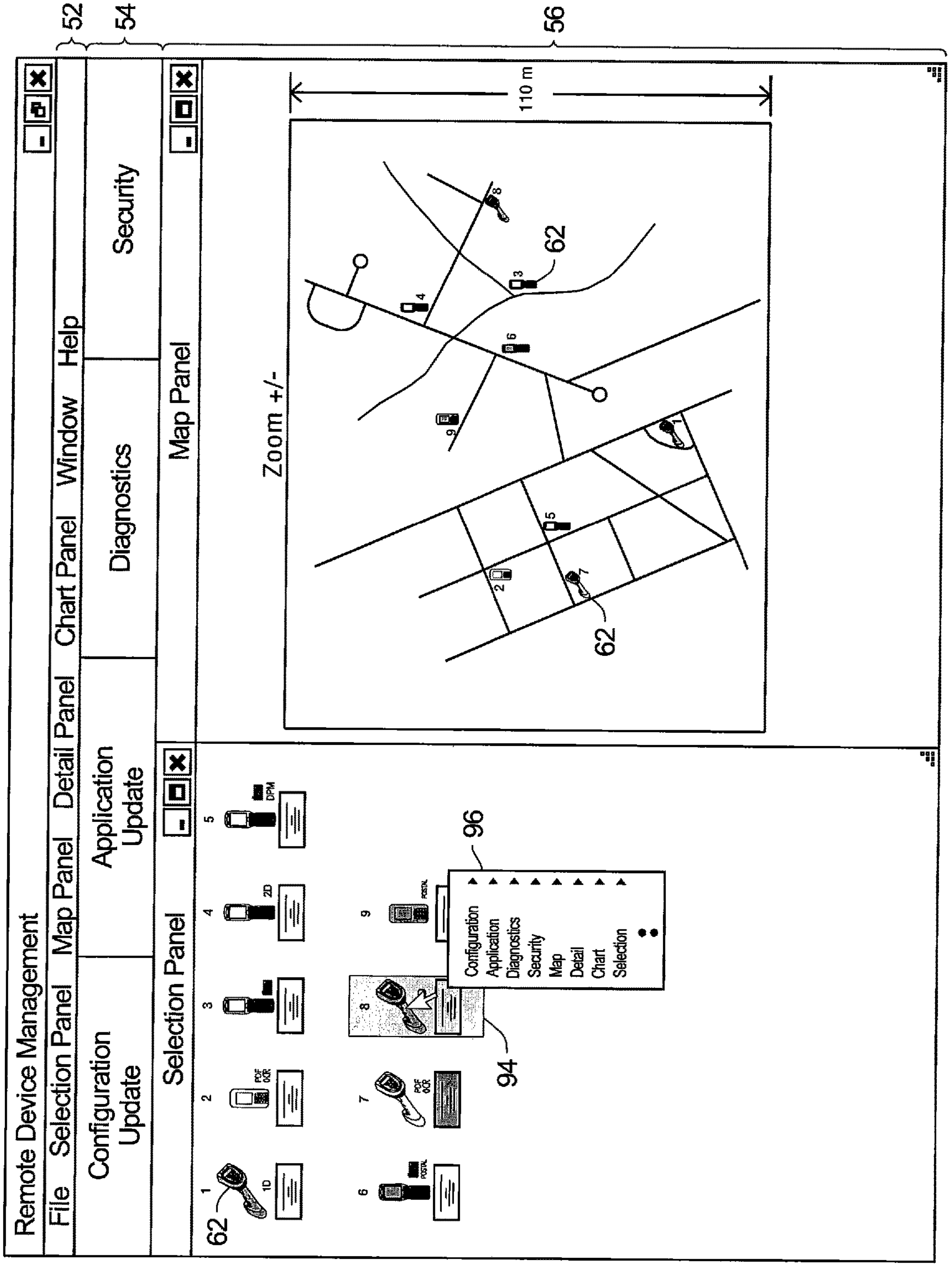

FIG. 2E is FIG. 2D after a right click of the pointing device 30 on the icon in the selection box representing the number 8 remote device. A box 94 may be formed around the device number 8 icon and a selection box 96 is presented to the user. Hovering the pointing device over any of the items listed in the selection box 96 may cause a further list (not shown) of choices for the user. In the embodiment shown in FIG. 2E the first four items, Configuration, Application, Diagnostics, and Security, may provide the same items as clicking the respective boxes in the menu section 54. The four items Selection, Map, Detail, and Chart may provide the same options as clicking each of the corresponding items in the menu section 52. Additional items, indicated by the vertical bullets, may be included in the selection box 96. These additional items may be commands to the selected remote devices to send certain data to the server 20 so that the data would be available to the user for further analysis and comparison.

Figure 2F:
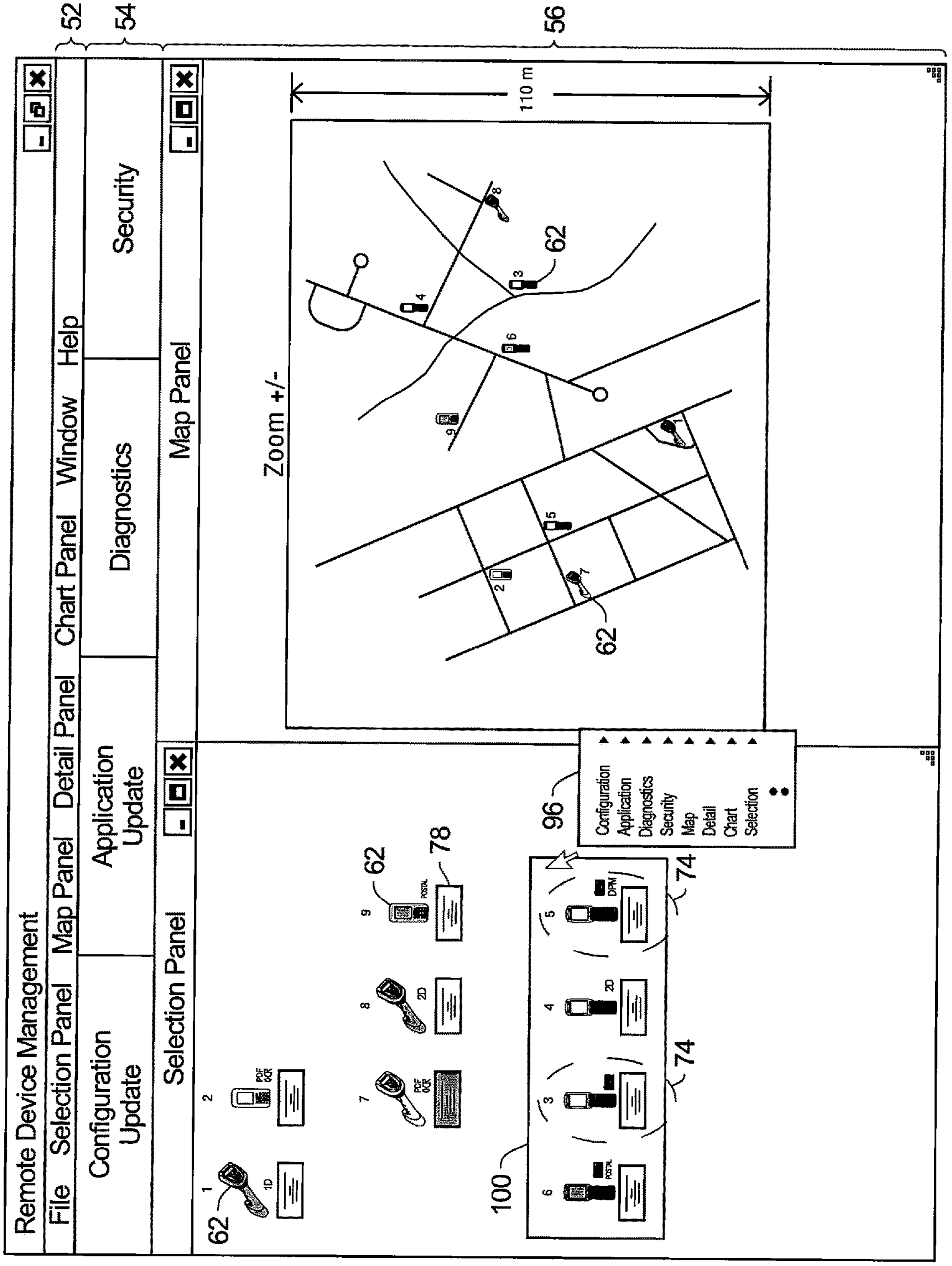

FIG. 2F is FIG. 2D after four of the remote device icons have been dragged to a new position in the selection pane, a box 100 drawn around the four icons using the pointing device 30, and the selection box 96 made to appear by a right click on the pointing device 30 inside the box 84 away from any of the icon groups 74. By dragging selected icons corresponding to selected remote devices to one region, drawing a box around the selected icons, and right clicking on the box 100 a user can perform the same operation on several remote devices at once. For example, all of the devices within the box 100 can be upgraded with a new configuration by a user using the user interface screen shown in FIG. 2F. Hovering over an area of the box that is not filed with icon grouping 74 may bring up a configuration box which shows only the configuration parameters that are common to all of the remote devices inside the box. Thus, in FIG. 2F, hovering over an area of the box 100 that is not occupied by one of icon groupings 74 will produce a configuration box showing the common model numbers of the remote devices 3, 4, 5, and 6 if they are the same models, plus any other common configuration parameters.

Figure 2G:
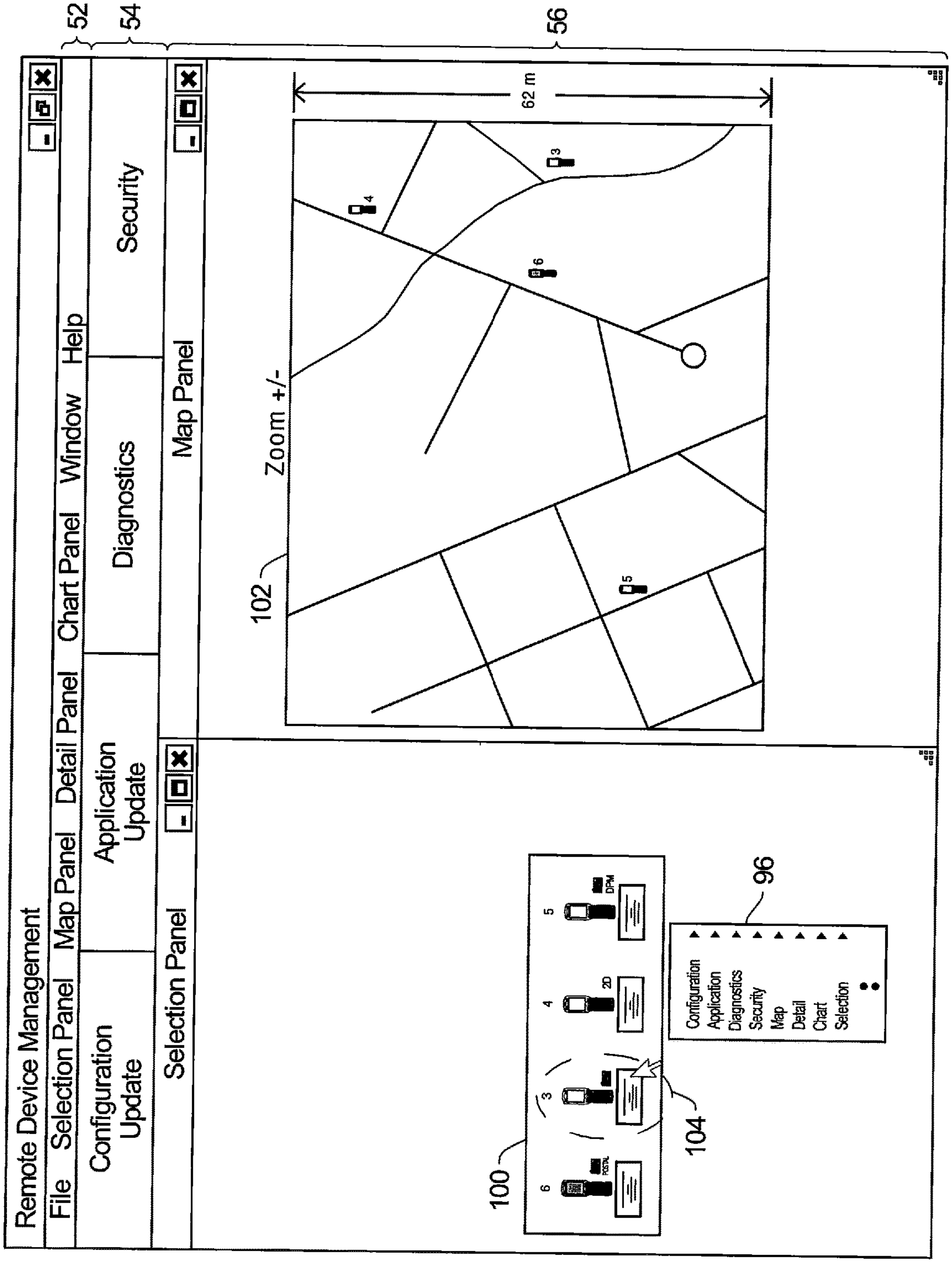

FIG. 2G is FIG. 2F after the user has expanded a section around a selected location in the map 60 to form a more detailed map 102. The user has also elected to hide the remote devices other than the four remote devices inside the box 100 in both the selection panel and the map panel. Also, one of the icon groupings, 104, has been right clicked which brings up the selection box 96. In the embodiment shown in FIG. 2G, by using the selection box 96 the remote device represented by the icon grouping 104 may be updated by changing the application in the remote device or by changing the configuration of the remote device.

Figure 2H:
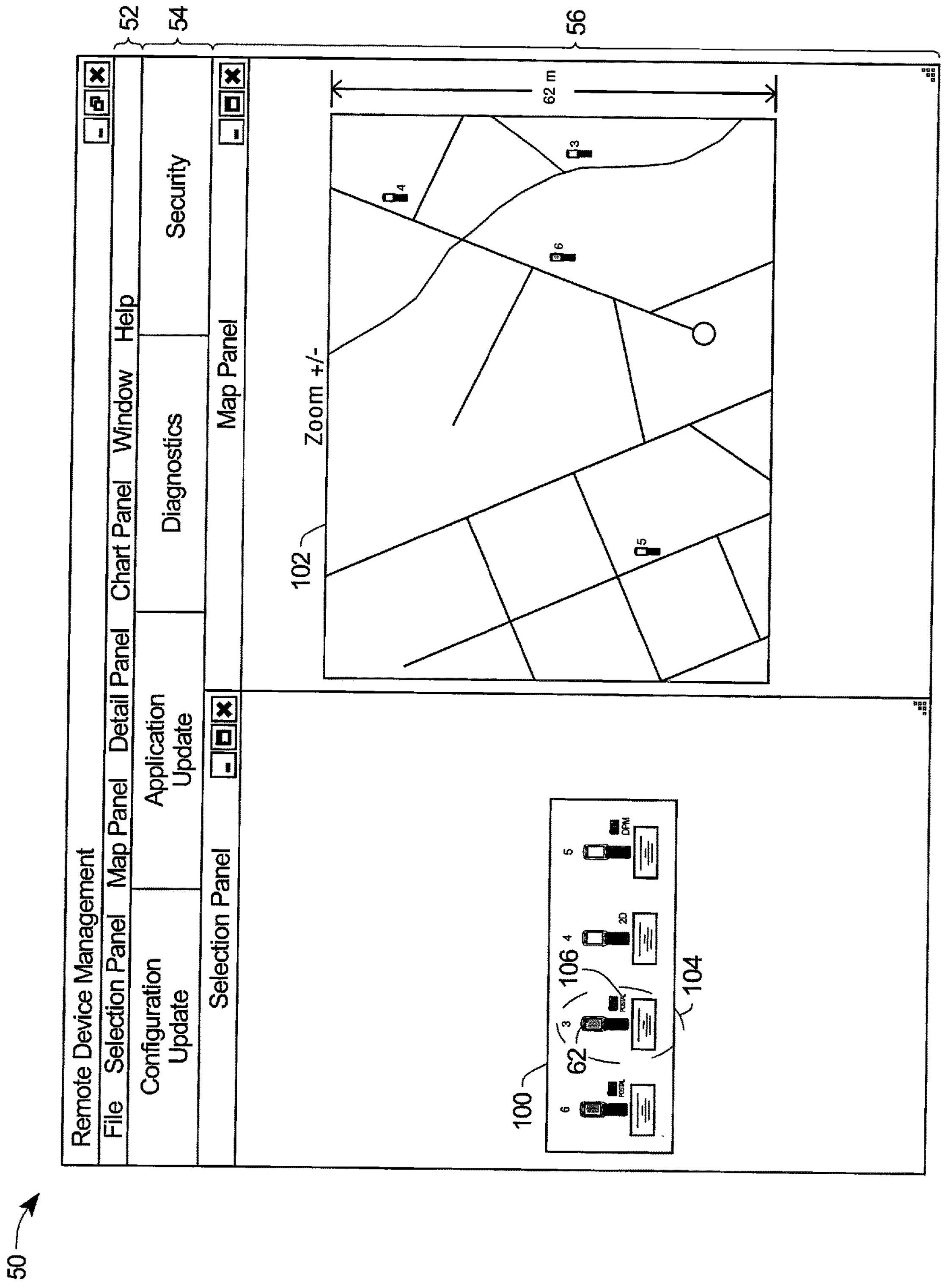

FIG. 2H is FIG. 2G after the remote device represented by icon grouping 104 has been updated which may result in displaying the remote device icon 62 in a new color thus confirming the update. Also, another icon 106 has been added to the remote device icon 104 in FIG. 2H indicating that the remote device now has the ability to interpret postal code symbols.

Figure 2I:
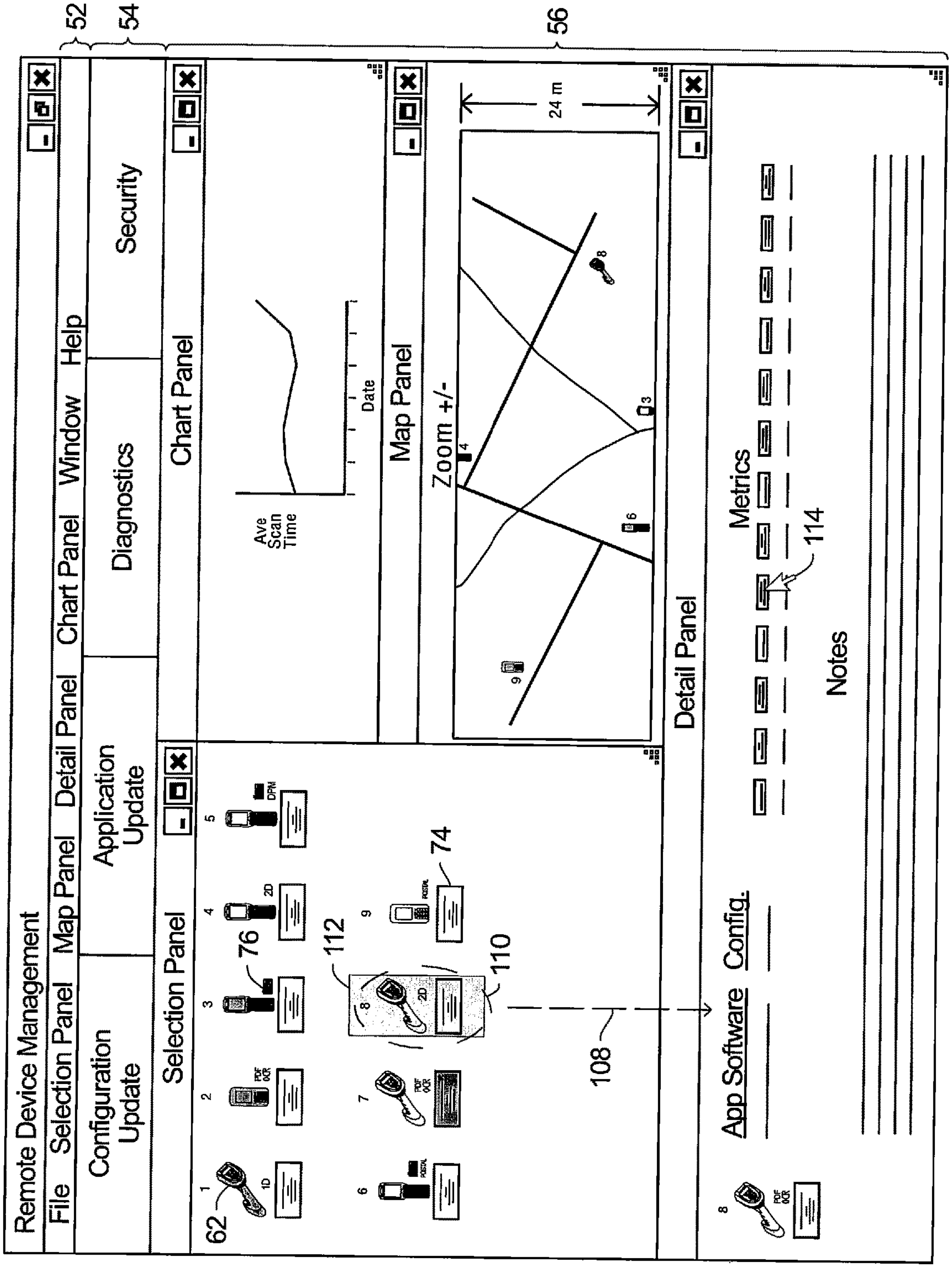

FIG. 2I shows the process of dragging an icon from the selection panel to the detail panel, as indicated by dashed line 108. A single left click may highlight the icon group 110 and the associated information with a box 112, and the box can be dragged into the detail panel. The transfer into the detail panel leaves the icon group 74 in the selection panel in one embodiment of the present invention. Also, by double left clicking on one of the metrics, as indicated by arrow 114, causes a plot of the metric value for a predetermined number of dates to be presented in the chart panel.

When the remote device manager interface screen is closed, the last screen and the setting in the selection, map, detail, and chart panels are saved and restored to the user when the interface screen is brought up the next time.

The user interface screens shown in FIGS. 2A-2I allow a user to address configuration issues by providing a graphical configuration tool. In addition, new devices introduced into the system can be quickly identified and brought into a desired configuration using the graphical user interfaces described above.

Figure 3:
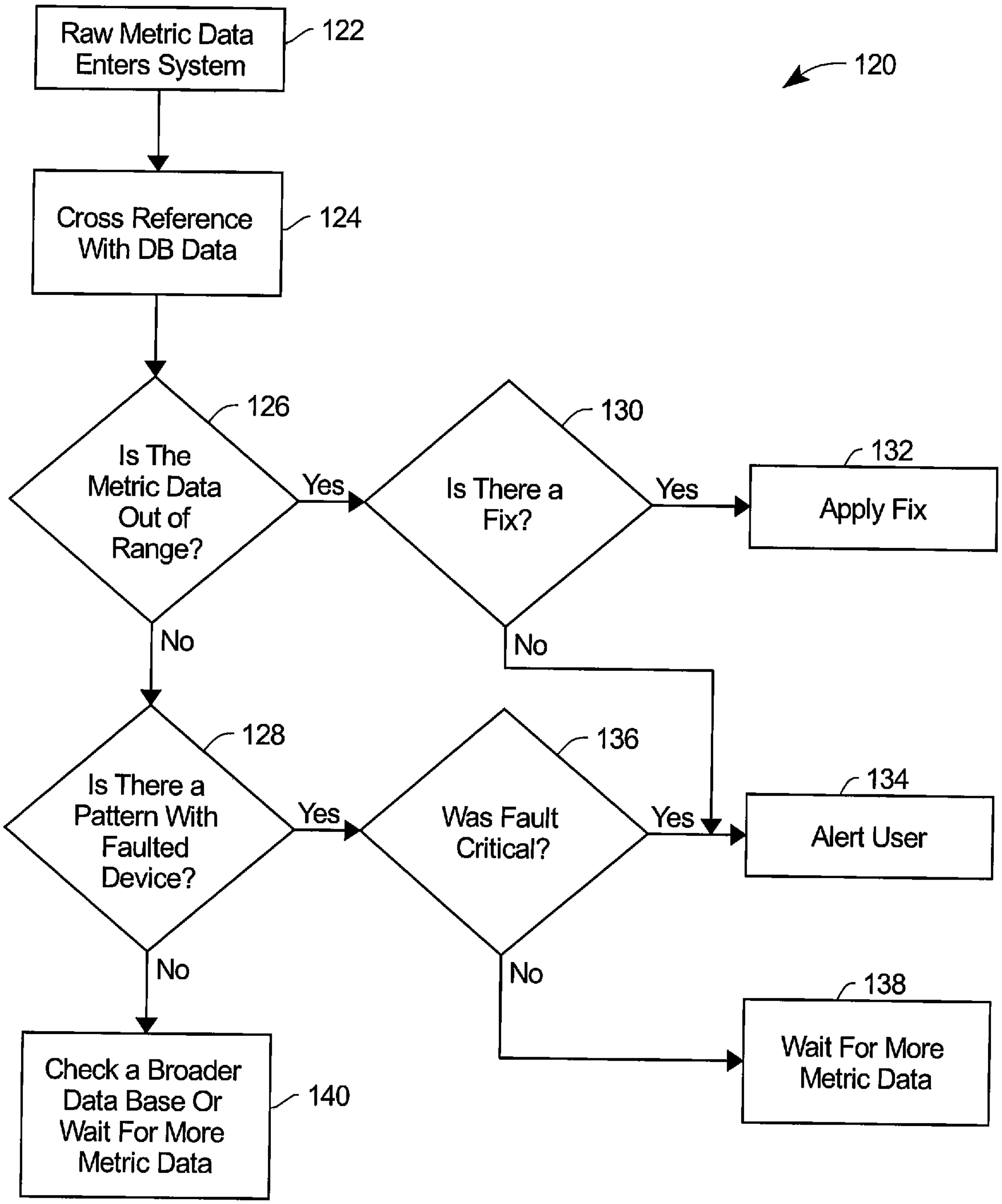
FIG. 3 is a flow chart of a method for recognizing a problem with one of the remote devices shown in FIG. 1, and resolving the problem, if possible, using data received from other remote devices.

FIG. 3 is a flow chart 120 showing a process for identifying faults or potential faults in the remote devices 62. The server 20 receives raw metric data which enter the system as indicated by box 122. Such metrics may include CPU load, scan times, and the other monitored events listed in U.S. Patent Publication 2008/0185432. The raw metric data can be sent to the server automatically or can be sent to the server as a result of a request for information by the server 20. The server 20 will cross reference the new data with specifications for the acceptable range of the metric data stored in the data storage module 34 to determine if a new metric is out of tolerance, and may also compare the new metric data with previous data to determine if the new metric data deviates significantly from the mean of the previous metric data for the same type and configuration of remote device 62 as indicated by boxes 124 and 126.

If the metric data is out of range, in that it is out of tolerance or deviates significantly from the mean of previous metric data, or in case of a notification from a remote device of an error or device fault, the server 20 would try to correlate this data with previous data to determine if the fault has previously occurred as indicated by box 128. In both cases the system would also attempt to find a correlation between the device with the issue and the device model, revision, installed software, etc. of other devices. In this way it would not only detect a problem, but detect precisely what other devices may have the same issue and, therefore, automatically update those devices. In the correlation process, indicated by box 128, the system will also attempt to make correlations between a metric that is out of range and devices that had the same or similar out of range condition, thus being able to anticipate if a system is likely to have a problem. The events that it would compare would not be limited to faults or out of tolerance metrics as even data that seems okay could be a predictor of an issue. As the database grows and its mesh of event correlations grows, the system would be increasingly effective at predicting issues.

If the metric data is out of range by the test described above and indicated in box 126, the server 20 determines if a fix is available for the out of range condition as indicated by box 130. If a fix is available, the fix is applied as indicated in box 132. If a fix is not available, a user is alerted as indicated in box 134. Here the term "user" refers to either the operator of the remote device or a person in charge of the remote devices 62, or both.

If it is determined that there is a pattern with the faulted device, the device that has a metric that is out of range, in the test indicated in boxes 126 and 128, then a determination is made whether the fault is critical as indicated in box 136. If the fault is critical, then the user is alerted as indicated by box 134, and if the fault is not critical, the server will wait for more metric data as indicated in box 138 by returning to receive new raw metric data indicated by box 122. If it is determined that there is not a pattern with the faulted device in box 128, then a check is made using a broader data base, such as a data base made available from a manufacturer of the particular remote device, or wait for more metric data as indicated in box 140 by returning to receive new raw metric data indicated by box 122.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method for managing a plurality of remote devices, the method comprising:

providing a user interface, the user interface comprising a map of a geographical region in which one or more remote devices of the plurality of remote devices are located, wherein each remote device of the plurality of remote devices is a mobile data collection device that is configurable by receiving one or more software updates from a server;

displaying, for each remote device of the one or more remote devices, a respective icon representative of the respective remote device on the map at a first location on the map that corresponds to a first location of the remote device in the geographical region, the first location of the remote device on the map determined at least in part based upon a first location data obtained from the remote device;

displaying, for each icon placed on the map, a first graphical characteristic of the respective icon to indicate a first configuration status;

adjusting the first graphical characteristic to a second graphical characteristic in response to determining that the remote device has changed to a second configuration status, the second configuration status determined based on performance data comprising a scan time for the remote device to conduct symbology scanning, and wherein adjusting the first graphical characteristic to the second graphical characteristic comprises:

determining whether the scan time deviates from a mean of previous scan times, in response to determining that the scan time deviates from the mean of previous scan times, determining that the performance data is out of specification and indicates a fault associated with the remote device, and assessing the second configuration status of the remote device based on an application of an update, which addresses the fault indicated by the performance data being out of specification, to the remote device based on the performance data being out of specification;

adjusting the respective icon representative of the respective remote device on the map to a second location on the map from the first location of the remote device on the map in response to determining a second location of the remote device in the geographical region, the second location of the remote device on the map determined at least in part based upon a second location data obtained from the remote device; and determining a correlation between the remote device and at least one other remote device of the plurality of remote devices for ascertaining that the at least one other remote device is likely to exhibit the fault and, based on the determination, automatically applying the update to the at least one other remote device.

2. The method of claim 1, further comprising:

updating a configuration of the remote device to extend decoding capability of the remote device to a different or an additional symbology; and adding another icon on the user interface to indicate the additional symbology associated with the extended decoding capability of the remote device.

3. The method of claim 1, further comprising, determining that the update addresses the fault indicated by the performance data being out of specification, determining that the update is available, and applying the update in response to the update being available, wherein the second graphical characteristic of the respective icon reflects the applied update.

4. The method of claim 1, further comprising, based on selection of an icon on the map, displaying current data collected using the remote device represented by the selected icon, and displaying configuration data for the remote device represented by the selected icon, wherein the configuration data comprises an indication of a corresponding type of symbology that the remote device represented by the selected icon is configured to scan.

5. The method of claim 1, further comprising, displaying, on the map, icons of all remote devices, of the one of more remote devices, which are of a selected type, and hiding, on the map, icons of all remote devices, of the one or more remote devices, which are of a type other than the selected type.

6. The method of claim 5, further comprising, based on selection of an icon on the map, displaying current data collected using the remote device represented by the selected icon, and displaying configuration data for the remote device represented by the selected icon.

7. The method of claim 1, further comprising displaying, on the user interface, a graph of an average scan time in relation to a scan time reported by a selected remote device.

8. The method of claim 1, further comprising, displaying configuration information for the remote device by at least one of selecting or hovering over the icon.

9. The method of claim 1, further comprising, receiving, a notification of the fault from the remote device, and in response, applying the update to the remote device.

10. The method of claim 1, further comprising, providing, a selection panel on the user interface, the selection panel comprising multiple icon groupings, each icon grouping corresponding to a respective icon placed on the map, wherein an icon grouping comprises a device icon for the remote device represented by the icon, on the map, to which the icon grouping corresponds and further comprises at least one additional icon representative of at least one characteristic of the remote device represented by the icon, on the map, to which the icon grouping corresponds.

11. The method of claim 10, further comprising:

dragging and dropping selected icon groupings of the multiple icon groupings to an area of the selection panel;

enclosing the area of the selection panel in a boundary, comprising enclosing the selected icon groupings within the boundary;

applying a common software update to each of the remote devices represented by the icons, on the map, to which the selected icon groupings enclosed within the boundary correspond; and selecting an icon grouping of the selected icon groupings enclosed within the boundary and updating the remote device, represented by the icon, on the map, to which the selected icon grouping corresponds, with individual updates for that remote device.

12. The method of claim 1, wherein based on the performance data being out of specification, the application of the update is withheld pending collection of further performance data, wherein a current configuration status is determined based further on collection of the further performance data.

13. The method of claim 1, wherein the performance data comprises a central processing unit (CPU) load associated with the remote device, wherein adjusting the first graphical characteristic to the second graphical characteristic comprises:

in response to determining that the CPU load deviates from a mean of previous CPU loads, determining that the performance data is out of specification and indicates the fault associated with the remote device.

14. A system for managing a plurality of remote devices, the system comprising:

a client device comprising a display;

a central processing unit configured to communicate with the plurality of remote devices and the client device, wherein the plurality of remote devices are mobile data collection devices, wherein the central processing unit is further configured to:

receive a first location data from the plurality of remote devices, wherein the first location data indicates a current location of a remote device of the plurality of remote devices;

provide, to the client device, a map of a geographical region in which at least one of the plurality of remote devices are located, wherein the client device displays a user interface comprising the map;

provide, to the client device, a respective icon representative of the respective remote device to be placed on the map at a first location on the map that corresponds to a first location of the remote device in the geographical region based on the first location data;

obtain a performance data from at least one of the plurality of remote devices, wherein the performance data comprises data representative of a scan time for the remote device to scan a symbology;

determine a current configuration status of the remote device by comparing the scan time for the remote device to scan the symbology to a mean of previous scan times in order to determine whether the performance data is out of specification and indicates a fault associated with the remote device, and wherein the current configuration status is determined based further on an application of a configuration update, which addresses the fault indicated by the performance data being out of specification, to the remote device based on the performance data being out of specification;

determine a correlation between the remote device and at least one other remote device from the plurality of remote devices for ascertaining that the at least one other remote device is likely to exhibit the fault and, based on the correlation, automatically applying the configuration update to the at least one other remote device;

provide, to the client device, at least one new icon indicating the current configuration status for at least one remote device represented by the icon, wherein the at least one new icon comprises an adjustment to a graphical characteristic of the icon representing the remote device; and provide, to the client device, a second location for at least one icon placed on the map, wherein the second location of the respective icon indicates a second location of the remote device in the geographical region, the second location determined at least in part based upon a second location data obtained from the remote device.

15. The system of claim 14, wherein the central processing unit is further configured to:

update a configuration of the remote device to extend decoding capability of the remote device to an additional symbology; and adding another icon on the user interface to indicate the additional symbology associated with the extended decoding capability of the remote device.

16. The system of claim 14, wherein the central processing unit is further configured to: determine that the configuration update addresses the fault indicated by the performance data being out of specification, determine that the configuration update is available, and apply the configuration update in response to the configuration update being available, wherein the current configuration status indicated by the adjusting of the graphical characteristic of the respective icon reflects the applied update.

17. The system of claim 14, wherein, based on selection of an icon on the map, the central processing unit is further configured to display current data collected using the remote device represented by the selected icon, and display configuration data for the remote device represented by the selected icon.

18. The system of claim 14, wherein the central processing unit is further configured to provide a selection panel of the user interface, the selection panel comprising multiple icon groupings, each icon grouping corresponding to a respective icon placed on the map, wherein an icon grouping comprises a device icon for the remote device represented by the icon, on the map, to which the icon grouping corresponds and further comprises at least one additional icon representative of at least one characteristic of the remote device represented by the icon, on the map, to which the icon grouping corresponds.

19. The system of claim 18, wherein, based on dragging and dropping selected icon groupings of the multiple icon groupings to an area of the selection panel, and based on enclosing the area of the selection panel in a boundary, comprising enclosing the selected icon groupings within the boundary, the central processing unit is further configured to apply a group software update to each of the remote devices represented by the icons, on the map, to which the selected icon groupings enclosed within the boundary correspond.

20. The system of claim 14, wherein the performance data comprises a central processing unit (CPU) load associated with the remote device, wherein the central processing unit is further configured to:

in response to determining that the CPU load deviates from a mean of previous CPU loads, determine that the performance data is out of specification and indicates the fault associated with the remote device.

21. A device for managing a plurality of remote devices, the device comprising:

a display configured to display a user interface, wherein the user interface comprises a map of a geographical region in which at least one of the plurality of remote devices are located, wherein each remote device is a mobile data collection device;

wherein the device is configured to:

display, on the user interface, a plurality of icons, wherein each icon is representative of each remote device on the map at a first location on the map that corresponds to a first location of the remote device in the geographical region;

display, on the user interface, a manipulated graphical characteristic of at least one icon to indicate a current configuration status for the remote device represented by the icon, wherein the current configuration status indicates whether a performance data of the remote device comprising a scan time for the remote device to conduct symbology scanning is out of specification and indicates a fault associated with the remote device based on comparing the scan time to a mean of previous scan times, and wherein the current configuration status further indicates an application of a configuration update, which addresses the fault indicated by the performance data being out of specification, to the remote device based on the performance data being out of specification;

determine a correlation between the remote device and at least one other remote device from the plurality of remote devices for ascertaining that the at least one other remote device is likely to exhibit the fault and based on the correlation automatically applying the configuration update to the at least one other remote device; and display, on the user interface, a second location for each icon placed on the map in response to determining that the remote device has moved from the first location in the geographical region to a second location in the geographical region.

22. A network for remotely managing a plurality of remote devices, the network comprising:

a server in communication with the plurality of remote devices that are mobile data collection devices; and a data processing system in communication with a display, wherein the data processing system is configured to perform a method comprising:

providing a user interface, the user interface comprising a map of a geographical region in which one or more remote devices of the plurality of remote devices are located;

assigning a common icon type for each remote device of a same type, and placing for each remote device of the one or more remote devices, a respective icon representative of the respective remote device on the map at a first location on the map that corresponds to a first location of the remote device in the geographical region, the first location of the remote device on the map determined at least in part based upon a first location data obtained from the first location of the remote device in the geographical region, wherein the common icon type is used for icons representative of remote devices of the same type;

displaying, for each icon placed on the map, a first graphical characteristic of the respective icon to indicate a first configuration status;

adjusting the first graphical characteristic to a second graphical characteristic in response to determining that the remote device has changed to a second configuration status, the second configuration status determined based on performance data comprising a scan time for the remote device to conduct symbology scanning, and wherein adjusting the first graphical characteristic to the second graphical characteristic comprises:

in response to determining that the scan time deviates from a mean of previous scan times, determining that the performance data is out of specification and indicates a fault associated with the remote device, and assessing the second configuration status of the remote device based on an application of an update, which addresses the fault indicated by the performance data being out of specification, to the remote device based on the performance data being out of specification;

adjusting the respective icon representative of the respective remote device on the map to a second location on the map from the first location of the remote device on the map in response to determining a second location of the remote device in the geographical region, the second location of the remote device on the map determined at least in part based upon a second location data obtained from the remote device; and determining a correlation between the remote device and at least one other remote device of the plurality of remote devices for ascertaining that the at least one other remote device is likely to exhibit the fault and based on the determination automatically applying the update to the at least one other remote device.

* * * * *